Sept. 15, 1942.   H. H. HANSON ET AL   2,296,162
QUICK ACTING CLAMP
Filed Aug. 5, 1939   3 Sheets-Sheet 1

INVENTORS
HAROLD H. HANSON +
BY WILLIAM H. SORENSON
Wheeler, Wheeler & Wheeler
ATTORNEYS.

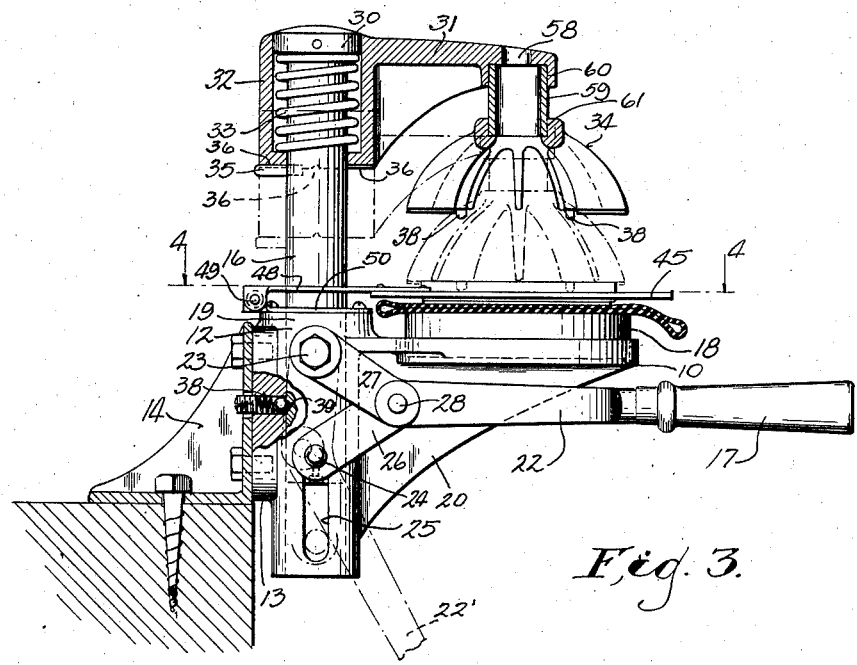
Fig. 3.
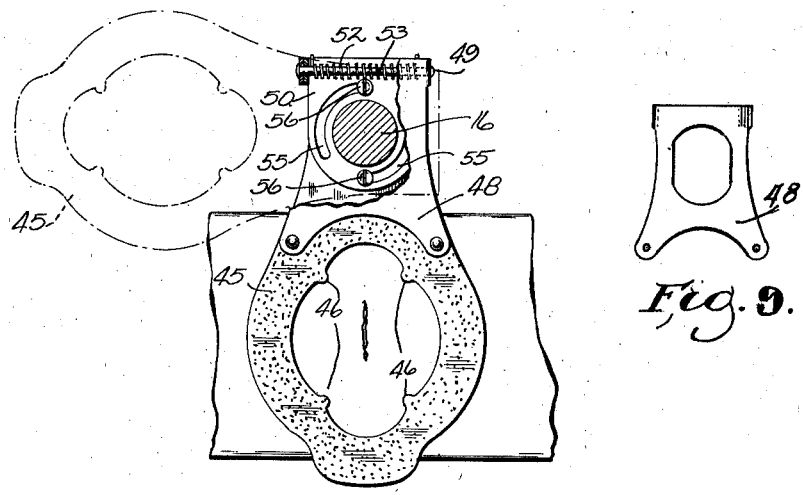
Fig. 4.
Fig. 9.

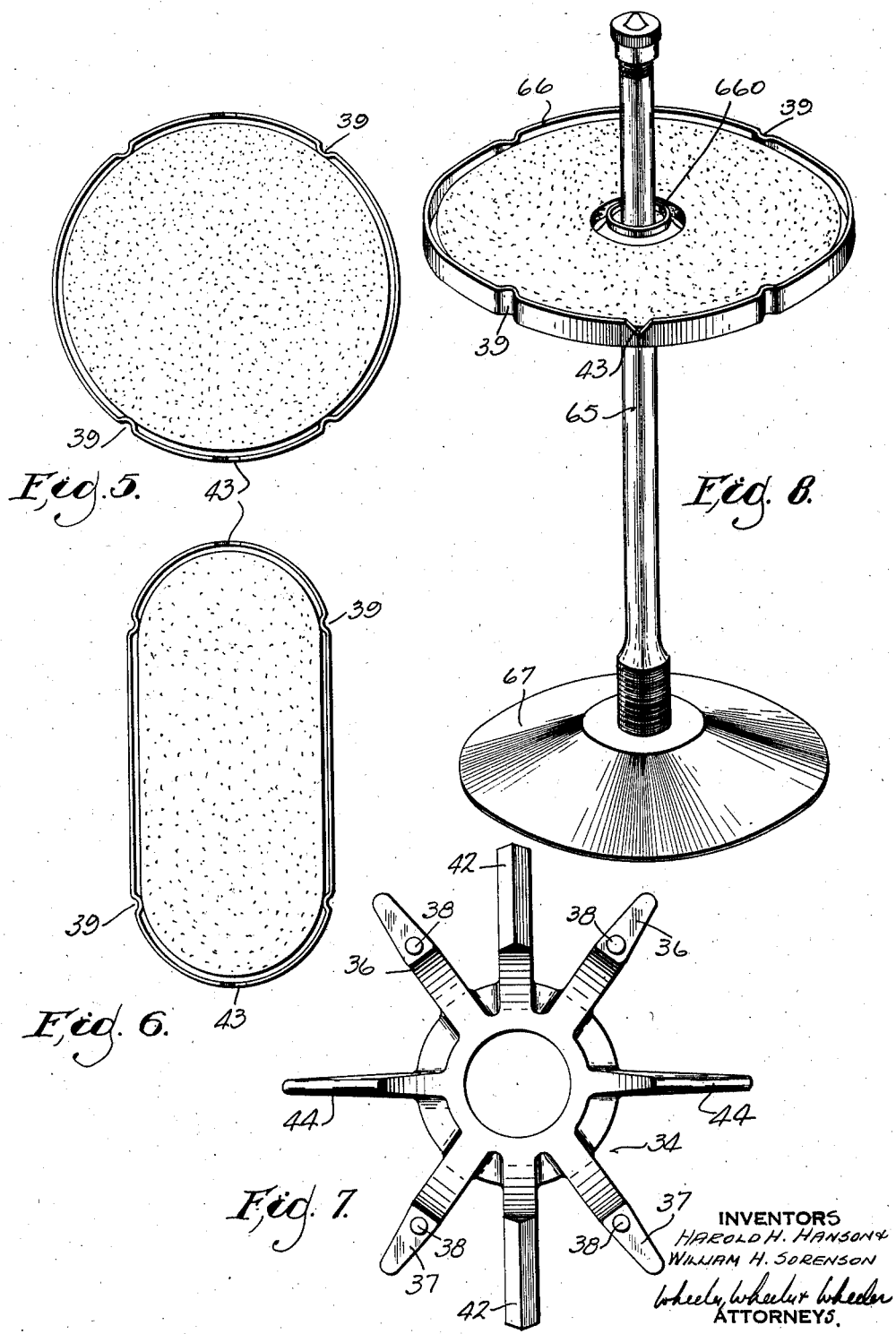

Patented Sept. 15, 1942

2,296,162

UNITED STATES PATENT OFFICE 2,296,162

QUICK ACTING CLAMP

Harold H. Hanson, Waupun, and William H. Sorenson, Fond du Lac, Wis., assignors to The Shaler Company, Waupun, Wis., a corporation of Wisconsin Application August 5, 1939, Serial No. 288,474

17 Claims. (Cl. 18—18)

Our invention relates to improvements in quick acting clamps, and more particularly it relates to clamps adapted for use in the vulcanization of rubber patch material to inner tubes and other articles composed wholly or in part of rubber.

In the art of repair vulcanization clamping mechanisms have heretofore not included means to enable an operator to accurately center a heat unit patch over the ruptured portion of work to be repaired because a repair patch and its associated platen completely covers the ruptured portion of the work over which it is being applied. Guesswork has been resorted to heretofore in the alignment of the patch with respect to the rupture. Skill has been required on the part of the operator to properly align the patch over the work and to prevent shifting therebetween during the clamping operation.

It is, therefore, one of the most important objects of our invention to provide means whereby an operator may center the work with respect to a patch positioning carrier mask so that when a patch platen is placed in the carrier, the patch is accurately centered with respect to the work. The movable platen of a repair vulcanizer is usually replaceable. It ordinarily comprises a thin metal, fuel containing cup and has a patch of vulcanizable rubber secured to its under surface. Therefore it is variously referred to as a "patch platen" or a "patch carrying platen."

It is a further object of the invention to provide means whereby the work is held against shifting after it has been centered and while the patch platen is being inserted in the carrier preparatory to the clamping operation and the patch platen, when inserted in the carrier, may be held against shifting with respect to the work.

A still further object is to provide a patch platen carrier mask which can be shifted both vertically and laterally from the work table while the work is being prepared and centered, said carrier being then returnable to normal operating position preparatory to applying the clamping pressure.

It is almost as important to the successful repair job to avoid unbalanced pressure upon the patch material and to avoid the danger that insufficient pressure will be applied to one point and excessive pressure to another as it is to control the number of heat units to be delivered into the rubber from a given quantity of burning fuel. The rate of heat transfer is dependent to a considerable extent upon the degree of pressure applied by the heat transferring platen to the patch material. It is important, also, that this degree of pressure be applied to work of a given thickness and that the pressure be increased or decreased as the thickness of the work is increased or decreased, respectively.

It is, therefore, a further and very important object of our invention to provide a clamp mechanism by means of which a pressure of factory predetermined magnitude will be automatically applied between the repair patch and the work when the clamp is depressed, said pressure being uniform as between work of equal thickness, but decreasing or increasing in degree with a corresponding decrease or increase in thickness of work being vulcanized.

Further objects are to provide:

A clamp mechanism which is adapted for universal use and vulcanizing repair patches in valve stems to inner tubes.

An improved clamping mechanism equally well adapted for use with circular or oval platens.

A clamping mechanism in which the operating lever is so positioned that all other parts of the mechanism are unconcealed by the arm of the operator while the clamping pressure is being applied and whereby the clamping mechanism may be more conveniently manipulated than heretofore.

In the drawings:

Figure 3 is a side elevation, in partial section, of the large clamp shown in Figures 1 and 2.

Figure 4 is a view taken along line 4—4 of Figure 3. The part 68 is a convexly cylindrical table, the use of which forms no part of the present invention.

Figure 5 is a plan view of a circular heat unit patch with platen adapted for use in conjunction with our improved clamp.

Figure 6 is a plan view of an oblong heat unit patch with platen adapted for use in conjunction with our clamp.

Figure 7 is a bottom view of the clamping spider shown in Figures 1, 2 and 3.

Figure 8 is a perspective view of a valve stem assembly and an associated heat unit patch platen adapted for use with our clamp.

Figure 9 is a detail view of the mask supporting hinge member 48.

Like parts are identified by the same reference characters throughout the several views.

Figure 1:
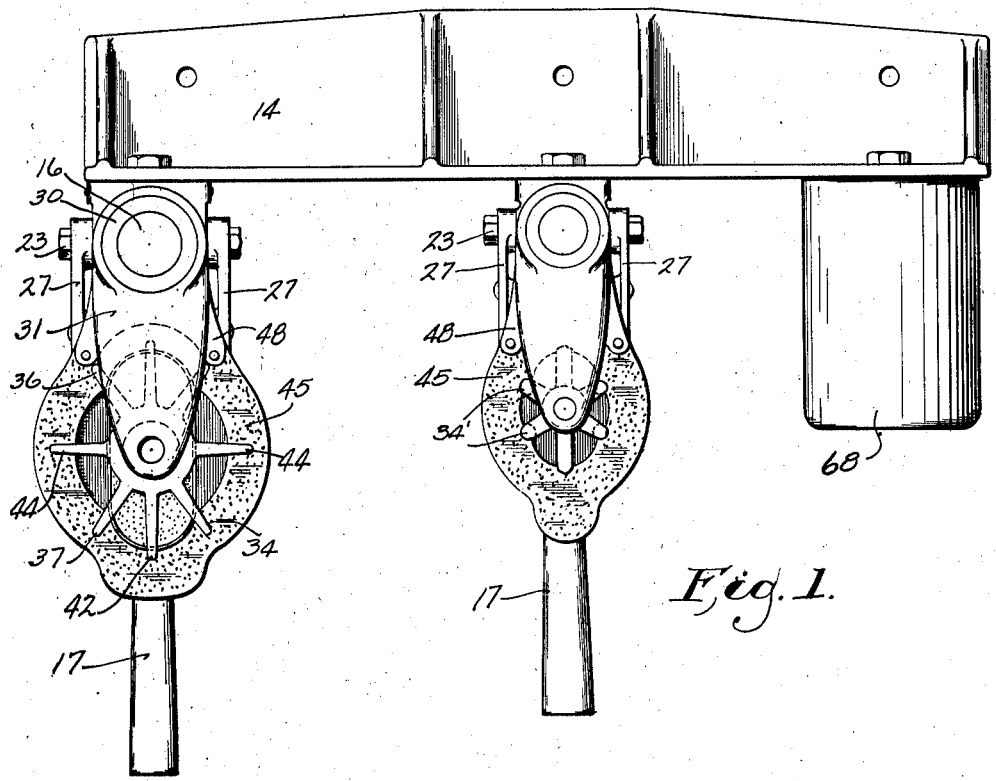
Figure 1 is a plan view of an assembly including two clamps in which the principles of our invention are incorporated.

In common with repair vulcanization of the general type to which this invention pertains, the embodiment of our improved quick acting vulcanizer clamp, depicted in the drawings, includes as main structural elements, a work receiving platform and associated supporting parts, a relatively movable fuel containing clamping platen adapted to engage the work between it and said table, a clamping spider for applying pressure to the clamping platen, and operating mechanism for actuating the clamping spider.

We have reorganized these main elements, structurally and functionally, to adapt them for cooperation in carrying out the objects of our invention, and each of the elements will now be described in the order in which they are here enumerated and with reference to their structural modification, after which we will describe their cooperative relationship and functional adaptability to the purposes in view.

The work receiving platform 10 is provided at one side with a vertically extending guideway 12 and associated means 13 for connecting the platform with suitable support, such, for example, as the bracket 14. The guideway 12 is adapted to receive a post-like bar 16 for supporting and actuating the clamping spider as hereinafter explained. The table 10 carries a resiliently yielding or otherwise fixed or base platen 18, preferably a block of solid rubber socketed in the upper surface of the table, as best shown in Fig. 3. Encircling the bar 16, the table is provided with a hub 19, to receive a support for the upper or movable platen.

The outer margin of the table is supported from the guideway 12 by a brace 20. The table and its associated parts, other than the base platen, may be formed integrally.

In use, the clamp is positioned vertically, as shown in the drawings, and hence all references will be made to the device in this normal position with the understanding that the term "vertical" is used for the purpose of description and not of limitation. Work receiving platform 10 is preferably circular or oblong in shape, as viewed from the top and it projects at a right angle from the guideway portion.

A forked lever arm 22 with attached handle 17 is oscillatably mounted on opposite sides of the guideway walls by means of studs 23 which extend through bores provided in the fork termini and screw into the walls adjacent hub 19. The guideway walls are provided with a pair of diametrically positioned axially extending slots 25 and bar 16 is provided with a cross pin 24 extending through a diametric bore which is aligned with slots 25.

The pin 24 extends through bar 16, and through a pair of link members 26 which connect with fork arms 27 of fork member 22 and may be secured within the bar by means of a set screw which is countersunk from the bottom of the bar. Link members 26 have their opposite extremities oscillatably mounted to fork arms 27 by means of loosely disposed pins 28 which project therethrough and are secured to fork arms 27. The lever and link assembly operates upon the toggle principle, the bar acting as a pull-rod whereby downward pressure is applied to the clamping spider, hereinafter described, by downward movement of the lever.

The bar 16 has a head 30, and an arm 31 of the clamping assembly is supported from the bar by a hub portion 32, the lower end of which is loosely fitted to the bar, whereas its upper end portion is loosely fitted to the bar head 30, whereby this hub may slide vertically upon the bar and be guided thereby. Between the lower end portion of the hub and the bar head 30 an annular socket is formed which receives the compression spring 33, the upper end of which is seated against the bar head 30, the lower end being seated against the hub at the lower end of the cavity. The spring normally supports the clamping assembly in the raised position in which it is illustrated by full lines in Fig. 3 by reason of downward movement of the arm relative to the bar being restricted by pin 35 which is secured to and extends radially from the bar. The lever assembly may be used to pull the bar downwardly until the clamping assembly occupies the dotted line position, as illustrated in Fig. 3, the spring being compressed during this operation. The bottom end of hub portion 32 is provided with notches 36 which are placed in 90 degree relation to each other to provide detent means between pin 35 and hub 32, whereby to lock arm 31 either in or out of clamping position.

An adjustable ball type detent 38 is provided in portion 13 of the platform and a socket 39 is provided in the bar, whereby the bar and its associated clamping assembly may be locked in a raised position by swinging lever 22 to its uppermost position to engage the detent ball in said socket. In this position, work may easily be placed on or removed from platen 18, and if desired, the clamping unit may be rotated about the bar to give an operator easy access to the work.

Material to be repaired, and a heat patch unit, may be securely clamped in pressure engagement between the clamping members and the resilient platen 18 by swinging lever 22 into its lowermost position whereby lever portions 27 and links 26 are forced in line with the axis of the bar in substantially knee-toggle relation, as heretofore mentioned, to force the bar and its associated clamping spider into their respective lowermost positions.

Figure 2:
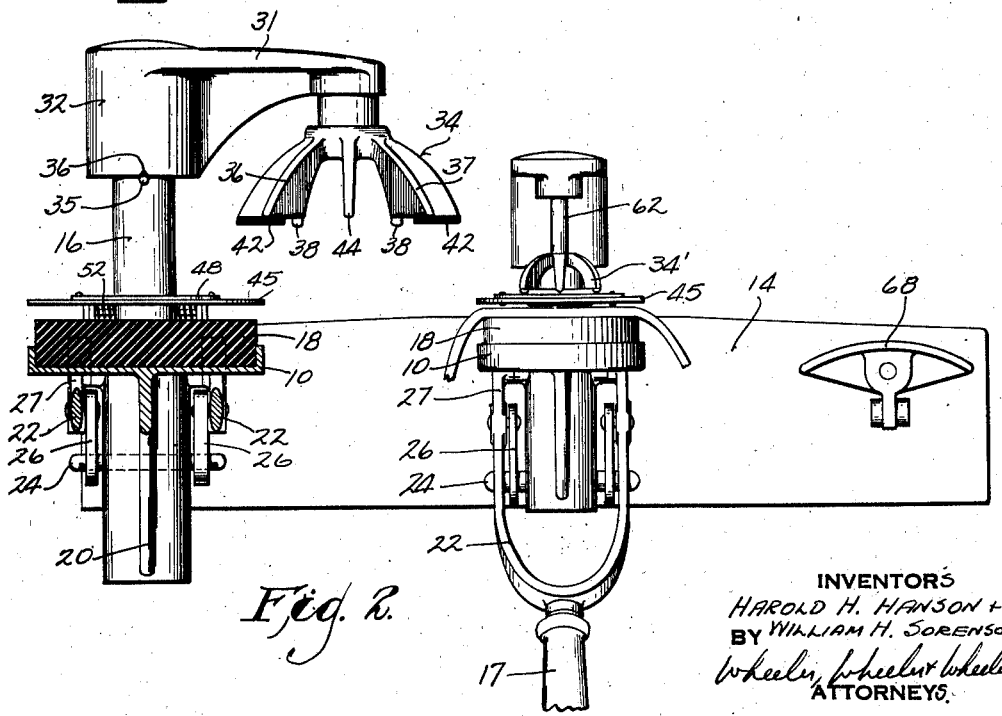
Figure 2 is a side elevation of the unit shown in Figure 1.

When an embodiment of our device is adapted to receive large sized heat unit patches, we provide the clamping spider 34 with eight depending arms, as best shown in the bottom view, Fig. 7, but with a device designed to handle the smaller sized units, we provide six depending arms, as shown at 34' in Figs. 1 and 2. Regardless of the total number of depending arms provided, two pairs of arms 36 and 37 are located in planes which are oblique to a central plane which includes the axis of the overarm 31 in its normal working position and the lever 17. The arms 36 and 37 are symmetrically disposed, and the member 36 of each pair is diametrically opposite its associated member 37. These arms 36 and 37 are provided with studs 38 which project downwardly from the inner portion of the lower arm ends, said studs being adapted to fit within indented portions 39 of the heat unit platen to secure said platen in respect to the clamping spider. Indented portions 39 are in the same relative spaced relation to the center in both the circular and oblong types of heat unit platen. A diametrically positioned pair of arms 42 extend radially of sleeve 59 and have convergent lower termini which fit in V-shaped apertures 43, Fig. 8, provided in the heat unit platens, whereby said arms press against the ignitable material within the platen to insure uniform heating of the metallic platen during the vulcanizing process and to prevent portions of the ignitable material from popping out and burning the material which is being repaired. Arms 44, Fig. 7, do not contact the side portions of an oblong platen, their function being to equalize pressure on the large size round heat unit platens as shown in Fig. 5.

To permit vulcanization of valve stem assemblies to inner tubes, arm 31 is provided with an aperture 58 and clamping spider 34 may be secured in a depending position to the free end portion of the arm, concentric with aperture 58, by means of an intermediate collar 59 which is disposed and welded within complementary bores 60 and 61, provided in the arm and spider respectively, as shown in Fig. 3, to allow a vertical opening through which a valve stem 65, Fig. 8, may be projected. A removable platen 66 is provided with a central aperture 66a through which the stem is projected, said platen being clamped adjacent the flanged end 67 of the stem during vulcanization. If a valve stem opening is not desired, other means, such as rod 62 (Figure 2), may be secured intermediate the spider and the arm. The part 68 is a convexly cylindrical table, the use of which forms no part of the present invention.

The positioning carrier for the upper removable platen, best shown in Fig. 4, includes a positioning mask 45 preferably of rigid non-heat conducting material and provided with a central aperture into which positioning projections 46 extend and are adapted to be received in the recesses 39 of the heat unit platen. The holder 45 is secured, preferably riveted, to a metallic hinge member 48 which is provided with an oblong aperture through which bar 16 projects, said member 48 being hinged at 49 to plate 50. A helically coiled spring 52 is mounted about hinge pin 53 and is confined under pressure by means of its ends being engaged with plate 50 and hinge 53, respectively, to bias hinge member 48, and hence guide member 45, toward the resilient platen 18. This rubber platen 18 has a frictional characteristic which aids in preventing the work from shifting during insertion of a heat unit in the holder 45 and whereby the work, the patch and the platen are all held in position while the clamping mechanism is being adjusted to clamping position.

Plate 50 is provided with arcuate slots 55 through which rivets 56 project, said rivets being secured to hub 19 whereby plate 50 is allowed to oscillate on the post-like bar 16 to an extent determined by the length of the slots 55. Therefore the carrier mask 45 and its supporting hinge member 48 may be lifted and swung laterally to facilitate the adjustment of a tire tube or other piece of ruptured work upon the relatively fixed base platen 18.

The clamping spider and its supporting arm 31 may also be swung laterally to facilitate positioning the work upon the base platen. Thereupon the carrier may be swung to operative position over the ruptured portion of the work. The rupture being visible through the aperture in the mask, the work can be adjusted until the rupture is centered with reference to the mask aperture. As soon as the centering operation is completed the spring 52 causes the mask to exert sufficient pressure upon the work to securely hold it in the position to which it has been adjusted.

The frictional characteristic of the cushioning base platen 18 aids in preventing any accidental shifting of the work while the fuel containing or patch carrying platen is being positioned in the mask aperture, this platen being then secured to the mask, preferably by engagement of the projections 46 in the grooves 39 of the platen. When these parts are accurately positioned the arm 31 may be swung to carry the clamping spider 34 to a position over the fuel unit platen preparatory to downward movement of the lever 22 to complete the clamping operation.

We attach great importance to the fact that all parts of the mechanism above the base platen 18 may be swung laterally while the work is being positioned on said platen 18. This allows the work to be not only positioned accurately and conveniently, but it also allows its surface to be cleaned and sand papered, or otherwise prepared for vulcanization of the patch to the work in rupture covering position. The carrier, with its mask and either with or without the patch carrying platen, may be lifted and swung laterally to and from position of use as many times as may be necessary to facilitate preparation of the work and readjustments thereof preparatory to the vulcanizing operation. The platen is of light weight and is readily engaged and held by the mask after once being adjusted therein.

Resilient platen 18 fits within a cup-shaped recess and is held therein by means of pressure engagement between said platen and the flanged wall of the recess.

As stated in the objects of this invention, our clamp is so designed that under given conditions, it will always apply a proper amount of pressure to the work. When work is placed on the resilient base platen 18 and a movable heat unit platen and patch have been positioned within the aperture of carrier or positioning mask 45, the operator will then swing the clamping spider 34 into clamping position and the spider will then be brought into contact with the platen when the operator lowers lever 22. Before the lever has reached its lowermost position in respect to base 10, expansion spring 33 will be compressed. When lever 22 reaches its locking position, as shown at 22', Fig. 3, this spring 33 determines the clamping pressure. The compression characteristics of spring 33 are of predetermined magnitude, hence when the clamp is in locked position, just the right pressure is applied between the work for which this specific device has been designed and the repair patch. In computing the compression characteristics of the spring to obtain the correct pressure between the work and the patch, the resilient properties of the base platen 18 must be considered.

It can readily be seen from the above description that pressure between the heat unit patch to be applied and the work to be repaired, will be subjected to slight variation directly proportional to the thickness of the work. In repair vulcanization, it has been found good practice to thus slightly increase the pressure with increased thickness of material to be repaired, hence this desirable result is automatically obtained in our clamp, as a part of the means for pressure predetermination.

In Figs. 1 and 2, we show an assembly especially adapted for garage use, said assembly comprising both a large and small size clamping unit secured to a mounting bracket 14 to which is secured a platen with arcuate work surface.

We are aware of the fact that various means have heretofore been devised for cushioning the work or cushioning the operation of the clamping devices, or both, but so far as we are aware such mechanisms as heretofore designed have been too expensive to construct and too cumbersome in operation to make them acceptable to users of such vulcanizers.

We claim:

1. The combination with a platen carrying bracket provided with a guideway having slotted walls, of a bar having one end slidably mounted in the guideway and having mounted to the other end thereof a radially extending arm, said arm being provided with a chamber in which said mentioned bar end is disposed, a compression spring coiled about the bar and within the chamber, a depending clamping member secured to the extended portion of said arm, a pin secured to the bar to extend through said slotted bracket walls, a lever pivoted to the bracket, and linkage operatively connecting the lever and the pin, said clamping member and its supporting arm being adapted to be swung laterally into and out of clamping position and said lever being located below the platen supporting portion of the bracket, whereby the space above its platen may be wholly unobstructed while the work carried by the platen is being prepared for vulcanization.

2. Clamping mechanism for repair vulcanizers including a support having fixed thereto a work receiving base platen, a clamping member slidably mounted on the support, means for locking said clamping member in clamping relation to the base platen, a holder tiltably and oscillatably mounted on the support, said holder comprising a portion provided with arcuate slots and oscillatably mounted on the support, a second portion hinged to said oscillatably mounted portion and provided with an elongated aperture through which the clamping means projects, and a non-heat-conducting member secured to said second portion and provided with an aperture adapted to receive removable platens of both the oblong and circular type, whereby the holder and the platen can be lifted to a tilted position and oscillated into or out of clamping position.

3. In a repair vulcanizer, the combination of a bracket provided with a work supporting platen composed of resiliently yielding material having a high frictional characteristic, a bar mounted to slide in said bracket along a line transverse to the plane of the work receiving face of said platen, a resiliently supported clamping head rotatably mounted on the upper end portion of said bar, a patch carrying platen, a centering device therefor mounted upon said bracket for independent oscillation about the axis of said bar, and mechanism for actuating said clamping head toward said platen comprising an operating lever having toggle connection with said bracket and bar below the level of said relatively fixed platen, whereby the space above said relatively fixed platen may be wholly unobstructed by any portion of said mechanism while work on the fixed platen is being prepared for a vulcanizing operation, said centering device and head being each adapted for independent swinging movement and centering adjustment over the work after the latter has been prepared.

4. In a repair vulcanizer, a work support including a resiliently yielding base platen having a high frictional characteristic, said base platen being adapted to support the work while it is being prepared for vulcanization, a removable patch carrying platen, a positioning carrier for the patch carrying platen mounted for swinging movement in both vertical and horizontal planes with reference to the work supporting platen, and having an apertured centering mask of non-heat conducting material in which the patch carrying platen is positioned for contact with the work, whereby said carrier may be swung laterally to facilitate adjustment and preparation of the work and may also be lifted to facilitate adjustment of the work thereunder to center a ruptured portion with reference to the patch carrying platen.

5. A vulcanizing clamp mechanism comprising the combination with a base platen, a clamping member, means mounting the platen and clamping member for relative movement to and from work engagement, and means for the relative actuation of said members to and from work engagement, of a mask for patch-carrying platens adapted to position such platens for engagement by said member, said mask being provided with means whereby it is tiltably and oscillatably mounted, and said means including a bearing member upon which said mask is rotatably swiveled for free lateral movement sufficiently far to expose said platen.

6. In a vulcanizing clamp, the combination with a normally free patch-carrying platen provided with vertically extending grooves for registry with groove-engaging arms of a platen clamping device, of a mask having an aperture in which said platen is engaged and having projections for interlocking connection with said grooves to hold the platen in position for registry of its grooves with said clamping arms.

7. A repair vulcanizer having a patch-carrying platen and a positioning mask composed of non-heat-conducting material whereby to restrict flow of heat from the platen into the mask during their operative association.

8. In a repair vulcanizer, the combination with mounting means and a platen carried thereby, said mounting means providing a vertical bearing, of a bar slidably mounted in the bearing, an operating lever disposed below the platen and having pivotal connection with the mounting means and toggle link connection with said bar for the actuation thereof downwardly toward said platen, and a clamping member carried by said bar and movable therewith toward said platen.

9. In a vulcanizing repair device, the combination with mounting means of a pair of clamping members one of which constitutes a platen, and means supporting one of said mounting members for movement to and from the other, of a lever in pivotal connection with the mounting means below the platen and provided with an operative actuating connection to the movable clamping member for its actuation to and from the other clamping member, at least one of said clamping members being provided with a yieldable mounting, and a spring support adapted to limit the clamping pressure which the movable clamping member exerts when actuated by said lever.

10. In a vulcanizing clamp, the combination with mounting means and clamping members carried thereby for relative movement to and from operative clamping engagement, one of said members constituting a platen, of a complementary removable platen provided with notched sides, and a positioning mask having an aperture in which the removable platen is disposed, said mask having means in interlocking engagement with the notches in the sides of the removable platen, the other clamping member comprising means for engaging the removable platen including fingers likewise engageable in the notched sides thereof.

11. In a vulcanizing clamp, the combination with a supporting bracket and a platen carried thereby, said supporting bracket providing a bearing, of a post reciprocable in the bearing in a direction substantially normal to said platen, a lever pivoted to the mounting means and having an operative connection with said post for its reciprocation, a work positioning mask having a pivotal connection to said post upon which said mask is movable laterally to and from registration with said platen, a clamping member above the platen and a mount for said clamping member having resilient support upon the end of said post and providing a yieldable motion transmitting connection from the post to said clamping member.

12. The device of claim 11 in combination with a removable platen adapted to be positioned in said mask and engageable by said clamping member, said removable platen having side wall notches in which said mask and said clamping member may each have portions in engagement, the mask being adapted by such engagement to hold the platen with its notches in position for reception of the clamping member when the latter is being actuated to clamping position.

13. A vulcanizing clamp comprising the combination with mounting means providing an upright bearing and a horizontal platen, of a post slidable in the bearing, a lever pivoted to the mounting means and provided with a toggle link connection to the post for its vertical reciprocation, a clamping spider spaced above the platen, a head mounted on the post and carrying the spider, said head being slidable with respect to the post and provided with a biasing spring urging it toward said platen, said head likewise being swiveled upon the post, and detent means yieldably determining the angular position of the head relative to the platen.

14. A vulcanizing clamp comprising the combination with mounting means providing an upright bearing and a horizontal platen, of a post slidable in the bearing, a lever pivoted to the mounting means and provided with a toggle link connection to the post for its vertical reciprocation, a clamping spider spaced above the platen, a head mounted on the post and carrying the spider, said head being slidable with respect to the post and provided with a biasing spring urging it toward said platen, said head likewise being swiveled upon the post and provided with detent means yieldably determining its angular position thereon in registry with the platen, a positioning mask intervening between said clamping spider and platen, and a removable upper platen complementary to the first mentioned platen and positioned for engagement by said spider, said mask having an aperture in which said upper platen is positioned.

15. The device of claim 14, in which the removable upper platen has side wall notches with which said spider and said mask each have tongue portions interlockingly engaged.

16. In a repair vulcanizer, a work positioning mask, and means for pivotally mounting said mask for movement in each of two distinct planes about axes fixed with respect to said mask.

17. In a repair vulcanizer, the combination with a base platen having a work receiving face, of a work positioning mask, pintle means offset from said platen and substantially normal to the plane of said face, a mask mounting member movable about said pintle means in general parallelism with the plane of the face, a hinge connecting said mask and said member for relative pivotal movement upon an axis parallel to said face and at right angles to said pintle means, said mask being oscillatable with said member about said pintle means and hingedly movable with respect to said member to and from the face of said platen, and a spring normally urging the mask in the direction of the platen.

HAROLD H. HANSON.
WILLIAM H. SORENSON.